(12) United States Patent
Wahler et al.

(10) Patent No.: US 9,087,193 B2
(45) Date of Patent: Jul. 21, 2015

(54) COMMUNICATION SYSTEM AND METHOD FOR NODES ASSOCIATED WITH A VEHICLE

(71) Applicant: GOGO LLC, Itasca, IL (US)

(72) Inventors: Ronald A. Wahler, Boulder, CO (US); Kevin Mahoney, Longmont, CO (US); Jon Worosylo, Broomfield, CO (US)

(73) Assignee: GOGO LLC, Itasca, IL (US)

( * ) Notice: Subject to any disclaimer, the term of this patent is extended or adjusted under 35 U.S.C. 154(b) by 310 days.

(21) Appl. No.: 13/675,194

(22) Filed: Nov. 13, 2012

(65) Prior Publication Data

US 2014/0136589 A1    May 15, 2014

(51) Int. Cl.
| G06F 15/173 | (2006.01) |
| G06F 21/55 | (2013.01) |
| H04L 29/08 | (2006.01) |
| H04L 29/06 | (2006.01) |
| G06F 12/00 | (2006.01) |

(52) U.S. Cl.
CPC ........ *G06F 21/554* (2013.01); *H04L 29/08144* (2013.01); *H04L 63/0263* (2013.01); *H04L 63/10* (2013.01); *H04L 67/12* (2013.01); *G06F 2221/2111* (2013.01); *G06F 2221/2113* (2013.01); *G06F 2221/2141* (2013.01)

(58) Field of Classification Search
USPC .......................... 709/203, 204, 223–229, 250
See application file for complete search history.

(56) References Cited

U.S. PATENT DOCUMENTS

| 5,652,795 A | 7/1997 | Dillon et al. |
| 5,699,384 A | 12/1997 | Dillon |
| 5,995,725 A | 11/1999 | Dillon |
| 5,995,726 A | 11/1999 | Dillon |
| 6,016,388 A | 1/2000 | Dillon |
| 6,047,165 A | 4/2000 | Wright et al. |
| 6,104,926 A | 8/2000 | Hogg et al. |
| 6,125,184 A | 9/2000 | Dillon et al. |

(Continued)

FOREIGN PATENT DOCUMENTS

WO    WO-2008/138376 A1    11/2008

OTHER PUBLICATIONS

International Search Report and Written Opinion for Application No. PCT/US2013/069531 dated Mar. 7, 2014.

(Continued)

*Primary Examiner* — Zarni Maung
(74) *Attorney, Agent, or Firm* — Marshall, Gerstein & Borun LLP

(57) ABSTRACT

Devices and nodes associated with a vehicle may communicate using a higher-level, common messaging protocol over an ad-hoc network to publish and subscribe to services, even though different nodes may utilize different types of links and channels. The network includes a rules node that is fixedly connected to the vehicle and that stores a set of rules. Given a possible publisher, subscriber, and/or a service, a node action is allowed or denied based on the set of rules. The rules may be generated or updated based on priorities, security levels, and/or characteristics of publishers, subscribers, their respective users, and/or services; a current dynamic condition; and/or user input. The rules node and at least one other node may be transported by the vehicle, and both transported nodes and nodes external to the vehicle may use the common messaging protocol to join the ad-hoc network, discover other nodes, authenticate, and publish/consume services.

7 Claims, 7 Drawing Sheets

(56) References Cited

U.S. PATENT DOCUMENTS

| | | |
|---|---|---|
| 6,131,160 A | 10/2000 | Dillon et al. |
| 6,161,141 A | 12/2000 | Dillon |
| 6,430,412 B1 | 8/2002 | Hogg et al. |
| 6,799,037 B1 | 9/2004 | Mielke et al. |
| 6,909,898 B2 | 6/2005 | Mielke et al. |
| 7,426,387 B2 | 9/2008 | Wright et al. |
| 7,426,388 B1 | 9/2008 | Wright et al. |
| 7,428,412 B2 | 9/2008 | Wright et al. |
| 7,559,691 B2 | 7/2009 | Fuhrmann |
| 7,599,691 B1 | 10/2009 | Mitchell |
| 7,689,752 B1 | 3/2010 | Redford et al. |
| RE42,536 E | 7/2011 | Leuca et al. |
| 8,032,135 B1 | 10/2011 | Redford et al. |
| 8,094,605 B2 | 1/2012 | Lynch et al. |
| 8,140,732 B2 | 3/2012 | Redford et al. |
| 8,457,034 B2 | 6/2013 | Kuehl et al. |
| 2002/0095498 A1 | 7/2002 | Chandra et al. |
| 2003/0055975 A1 | 3/2003 | Nelson et al. |
| 2003/0171094 A1 | 9/2003 | Kawai |
| 2004/0054918 A1 | 3/2004 | Duri et al. |
| 2004/0186760 A1 | 9/2004 | Metzger |
| 2004/0267410 A1* | 12/2004 | Duri et al. ............... 701/1 |
| 2005/0090283 A1 | 4/2005 | Rodriquez |
| 2006/0080321 A1* | 4/2006 | Horn et al. ............... 707/10 |
| 2008/0140571 A1* | 6/2008 | Inbarajan et al. .......... 705/51 |
| 2009/0100476 A1 | 4/2009 | Frisco et al. |
| 2010/0127193 A1 | 5/2010 | Abernathy et al. |
| 2011/0095905 A1 | 4/2011 | Mase |
| 2011/0112982 A1* | 5/2011 | Srinivasan et al. ........... 705/348 |
| 2011/0257834 A1 | 10/2011 | Hebb |
| 2012/0123629 A1* | 5/2012 | Edwards et al. ............. 701/29.1 |
| 2012/0214506 A1 | 8/2012 | Skaaksrud et al. |
| 2012/0303826 A1 | 11/2012 | Nelson et al. |
| 2014/0050118 A1* | 2/2014 | Chow et al. ................... 370/254 |

OTHER PUBLICATIONS

Digital Video Broadcasting (DVB); DVB-S2 Adaptive Coding and Modulation for Broadband Hybrid Satellite Dialup Applications,: ETSI TS 102 441 V1.1.1, Oct. 2005, 23 pages.

"Digital Video Broadcasting (DVB); Interaction channel through Public Switched Telecommunications Network (PSTN) / Integrated Services Digital Networks (ISDN)," European Telecommunication Standard, ETS 300 801: Aug. 1997, 14 pages.

"Digital Video Broadcasting (DVB); Interaction channel through the Global System for Mobile Communications (GSM)," European Broadcasting Union, EN 301 195 V1.1.1, Feb. 1999, 14 pages.

Written Opinion of the International Preliminary Examining Authority, International Application No. PCT/US2013/069531, mailing date Oct. 22, 2014.

* cited by examiner

_US 9,087,193 B2_

COMMUNICATION SYSTEM AND METHOD FOR NODES ASSOCIATED WITH A VEHICLE

FIELD AND BACKGROUND OF THE DISCLOSURE

1. Technical Field

The instant disclosure generally relates to a communication system and method for nodes or devices associated with a vehicle. More particularly, the instant disclosure generally relates to a communication system and method for publishing and subscribing to services over an ad-hoc network interconnecting nodes or devices on vehicles and external to vehicles.

2. Background

Existing systems and methods for publishing and subscribing to services in a network allow connections between publisher nodes and subscriber nodes. Typically, such systems and methods may suffer performance degradation due to bottlenecks on constrained data bearer channels that interconnect publishers and subscribers, and due to the ad-hoc selection of publishers or subscribers that are hosted on overloaded computing platforms. Furthermore, various devices included on and being transported by vehicles may be connected to different networks and may not be able to provide and consume services amongst each other and with devices or nodes that are external to the vehicle.

BRIEF SUMMARY OF THE DISCLOSURE

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

An embodiment of a system for publishing services and subscribing to services may include a rules node that is fixedly and/or rigidly connected to a vehicle. The rules node may include a processor, an interface to one or more networks, and a memory storing a set of rules defining relationships between one or more publisher nodes and one or more subscriber nodes. The rules node may be communicatively connected to a publisher node and to a subscriber node via the one or more networks. The system may further include computer-executable instructions that, when executed, may cause a node to receive one or more inputs such as an identification of a publisher node, an identification of a subscriber node, and/or an identification of a service, and may cause the node to determine, based on the one or more inputs, whether an action to be taken by the publisher node or the subscriber node is allowed or denied. The computer-executable instructions may be executed by the publisher node, by the subscriber node, and/or by the rules node. In an embodiment, at least one of the publisher node or the subscriber node is being transported by the vehicle, and the rules node is the sole node (of a set of nodes associated with the vehicle) that is an active rules provider node of the set of rules.

An embodiment of a publisher node associated with a vehicle may include an interface to a network and a publishing engine. The publishing engine may be configured to publish an indication of an available service using the interface to the network, and to determine, based on a set of rules provided by a rules node fixedly connected to the vehicle and communicatively connected to the network, one or more rules corresponding to an interrelationship between the publisher node and a subscriber node that is authenticated. The publishing engine may be further configured to provide the published service to the subscriber node based on the one or more rules.

An embodiment of a subscriber node associated with a vehicle may include an interface to a network and a subscribing engine. The subscribing engine may be configured to receive, via the interface to the network, an indication of a published service provided by a publisher node that is authenticated, and to request, via the interface to the network, the published service from the publisher node. The subscribing engine may be further configured to subscribe to, based on one or more rules provided by a rules node fixedly connected to the vehicle, the published service via the connection to the network. The one or more rules may correspond to an interrelationship between the subscriber node and the publisher node, in an embodiment.

DETAILED DESCRIPTION OF THE PREFERRED EMBODIMENTS

Figure 1:
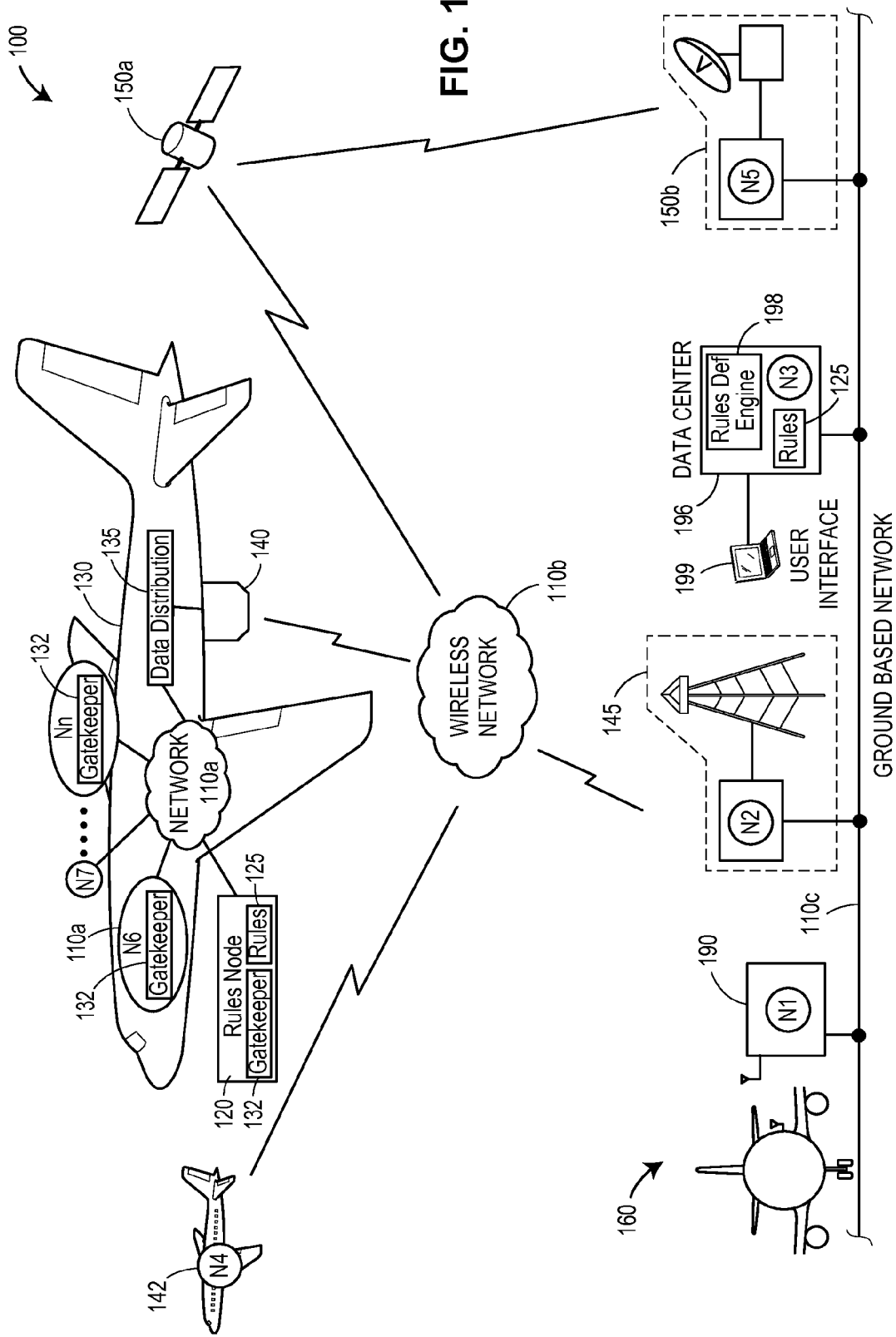
FIG. 1 illustrates an exemplary system for communications between devices or nodes associated with a vehicle by using a common messaging protocol over an ad-hoc network and a rules node of the vehicle.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Furthermore, any or all of the contents of the present disclosure may operate in conjunction with any or all of the contents of the disclosure of co-pending U.S. patent application Ser. No. 13/675,190 entitled "Ground System for Vehicle Data Distribution" and filed concurrently herewith, the contents of which are hereby incorporated by reference in their entirety. Additionally or alternatively, any or all of the contents of the present disclosure may operate in conjunction with any or all of the contents of the disclosure of co-pending U.S. patent application Ser. No. 13/675,200 entitled "Vehicle Data Distribution System and Method" and filed concurrently herewith, the contents of which are hereby incorporated by reference in their entirety.

Embodiments of systems and methods for communicating between devices or nodes associated with a vehicle may include a common messaging protocol used by publisher nodes and subscriber nodes that join an ad-hoc network. Additionally, the relationships between the publisher and subscriber nodes may be defined or governed by a set of rules stored in a rules node of the vehicle.

A "node," as generally referred to herein, includes a computing device having a processor, a network interface, and a memory storing computer-executable instructions. The instructions may be executed by the processor to communicate, using a common messaging protocol, over the network interface to join an ad-hoc network, discover other nodes in the ad-hoc network, publish services to the network, consume published services, and/or perform other actions. In some embodiments, a node may include one or more user interfaces.

In some embodiments, a node may be located on or within a vehicle so that the node is transported along with the vehicle as the vehicle moves, e.g., a "transported node." For example, a transported node may be an end-user consumer computing device such as a laptop computer, a handheld portable computing device, a phone, tablet or smart device, or other device that generally is not fixedly or rigidly attached to the vehicle by a tangible, physical connection. In other examples, a transported node may be a computing device that is fixedly and/or rigidly connected to a vehicle using a tangible, physical connection so that node is prevented from moving about the vehicle in an uncontrolled fashion when the vehicle moves. For example, fixedly connected, transported node may be included in a line replaceable unit (LRU) such as a navigation device, a cockpit electronics unit, a cabin electronics unit, or other similar device. Indeed, a vehicle may transport one or more nodes, at least some of which are rigidly and fixedly connected to the vehicle, and at least some of which are not rigidly and fixedly connected to the vehicle. Examples of vehicles that may transport nodes include aircraft, spacecraft, ground-based vehicles such as trucks, trains, automobiles, or busses, water-borne vehicles such as ships or boats, military vehicles, or any other vehicle that has the ability to move through the air, on the ground, through space, or on water. In an embodiment, nodes that are transported by a vehicle may be communicatively connected to one another and to other nodes that are not being transported by the vehicle.

Nodes that are not being transported by a particular vehicle are generally referred to herein as an "external node," e.g., a node that is external to the particular vehicle. In some embodiments, an external node may be located within an essentially fixed site, such as a cell site, a data center, a vehicle terminal gate, a building, a tower, or any other ground-based, stationary structure. In some embodiments, an external node to a particular vehicle may be transported by another moving entity, such as another vehicle (e.g., for Air-to-Air (ATA) communications between two aircraft or for communications from an aircraft to an aircraft carrier), or a satellite (e.g., for Air-to-Ground (ATG) communications using a satellite network).

Transported nodes and external nodes associated with a vehicle may join an ad-hoc network, and may communicate over the ad-hoc network with other nodes that are also associated with the vehicle. The ad-hoc network may include one or more wired networks, one or more wireless networks, or a collection of wired and wireless networks. The ad-hoc network may include private and/or public networks. In some embodiments, the ad-hoc network may include multiple different types of wired and wireless network links or data bearer channels implementing different link-layer and network-layer protocols. For example, the ad-hoc network may include a satellite communications network, another ATG network, a Wi-Fi network, a wired Ethernet network, and a wireless Ethernet network. Examples of some (but not all possible) types of networks that may be included in the ad-hoc network are described in aforementioned co-pending U.S. patent application Ser. No. 13/675,200 entitled "Vehicle Data Distribution System and Method", and in co-pending U.S. patent application Ser. No. 13/675,190 entitled "Ground System for Vehicle Data Distribution".

However, while different nodes in the ad-hoc network may be communicatively coupled to one another through different types of data-bearer channels and network links, the different nodes may implement a common, higher-level (e.g., application layer) messaging protocol. This common messaging protocol may provide, to publisher nodes and to subscriber nodes that do not have prior knowledge of one another, the ability to discover other nodes, publish and discover available services, authenticate one another, intercommunicate, and perform other actions, even though their respective network links may use different lower-level protocols and/or data bearer channels. As such, with the common messaging protocol, nodes may join and leave the ad-hoc network without having prior knowledge of the structure of the network, and the ad-hoc network is not required to include centralized network management.

Typically, a "publisher" node may provide a service that may be available for use or consumption by other nodes of the ad-hoc network, and a "subscriber" node may subscribe to or consume a published service. The terms "publisher node" and "publisher" are used interchangeably herein, and the terms "subscriber node" and "subscriber" are also used interchangeably herein. Services that may be provided by publisher nodes and consumed by subscriber nodes may include, for example, streaming digital media such as videos or music, flight information services, distribution of vehicle maintenance data collected on vehicle, or configuration of one or more devices on-board the vehicle. Other examples of possible services include a public branch exchange voice service, a time service, a global positioning system service, a domain name service, a wireless access point service, a storage service, a fault management and reporting service, a bearer data service, a software key service, a digital rights management service, a health monitoring and reporting service, and other services.

As discussed above, at least one of the nodes in the ad-hoc network is a rules node that stores the set of rules according to which publishers and subscribers enter into and maintain interrelationships in the ad-hoc network. Typically, the rules node is associated with a particular vehicle. The rules node may be fixedly and/or rigidly connected to the particular vehicle, and may be transported by the particular vehicle. The set of rules stored in the rules node of the vehicle may be based on constraints and limitations of the various data bearer channels included in the network, and/or may be based on individual properties of the publisher nodes, subscriber nodes, their respective users, and services. As such, based on the boundaries defined by the set of rules, the publisher nodes and subscriber nodes associated with the particular vehicle may provide and consume different services over the ad-hoc network. In an embodiment, a rules node may also be a provider of services (e.g., a publisher node) and/or a consumer of services (e.g., a subscriber node) within the ad-hoc network.

Generally, a particular vehicle may include a single, active rules node to service the publisher nodes and subscriber nodes being transported by the particular vehicle. In some embodiments, though, the particular vehicle may also include a back-up, inactive rules provider node in case of a failure of the active rules node. Furthermore, as many different vehicles may utilize at least some portions of the ad-hoc network, each different vehicle may transport a respective rules node storing a respective set of rules to service the publisher nodes and subscriber nodes associated therewith. These principles and techniques for communications between nodes or devices associated with a vehicle using a common messaging protocol and a rules node are discussed in more detail below.

FIG. 1 illustrates an embodiment of a system 100 for providing communications between various nodes or devices associated with a vehicle using a common messaging protocol. The system 100 may include a rules node 120 that is fixedly connected to a vehicle 130. The rules node 120 may store a set of one or more rules 125 which define interrelationships between nodes N1-Nn that may be associated with the vehicle 130. For example, the set of one or more rules 125 may define and govern node interrelationships between nodes based on node and service characteristics and priorities. Each node N1-Nn may be a publisher node, a subscriber node, or both a publisher and a subscriber node.

Each node N1-Nn may be in communicative connection with the rules node 120 and/or with one or more other nodes N1-Nn via one or more networks, such as the in-vehicle network 110a, the external (to the vehicle 130) wireless network 110b, a ground system network 110c, and/or other suitable network. Collectively, the networks 110a, 110b, 110c over which the nodes N1-Nn may communicate using the common messaging protocol are referred to herein as an "ad-hoc network 110," as each node N1-Nn may join the one or more networks 110 in an ad-hoc manner, e.g., without having prior knowledge of one another or of the structure of the network 110. In an embodiment, each of the nodes N1-Nn may communicate over the ad-hoc network 110 by using the common messaging protocol for discovery, authentication, providing services, subscribing to services, and the like. In an embodiment, at least one of the nodes (e.g., N6-Nn) is transported by the vehicle 130. In an embodiment, at least one of the nodes (e.g., N1-N5) is external to the vehicle 130 and is not being transported by the vehicle 130.

In an embodiment, each node N1-Nn may use the set of rules 125 stored at the rules node 120 to determine the constraints, boundaries, or definitions that govern or define its relationship with other publisher nodes and subscriber nodes. Typically, at any moment in time, the rules node 120 may be a sole, active rules provider node for nodes that are associated with the vehicle 130, e.g., the transported nodes N6-Nn and the external nodes N1-N5. However, in some embodiments, the vehicle 130 may also include a back-up, inactive rules provider node in case of a failure of the active rules provider node 120.

In an embodiment, the system 100 may include a rules gatekeeper 132 to access the set of rules 125 stored at the rules node 120. The rules gatekeeper 132 may receive an identification of a publisher node and/or receive an identification of a subscriber node, and based on the received identification(s), the rules gatekeeper 132 may determine whether or not a node action (e.g., an action to be taken by one of the nodes) is allowed or is denied. For example, the rules gatekeeper 132 may determine whether a particular publisher is allowed to publish a particular service, and the rules gatekeeper 132 may determine whether a particular subscriber is allowed to subscribe to a particular service. In an embodiment, the rules gatekeeper 132 may determine the allowance or denial based on a characteristic of the service. In an embodiment, the rules gatekeeper 132 may determine whether or authentication of a publisher or a subscriber is allowed to occur. Other actions in addition to publication, subscription and authentication that a node may take with respect to another node may be allowed or denied by the rules gatekeeper 132.

In some embodiments, the rules gatekeeper 132 may be included in a publisher node and/or in a subscriber node (e.g., nodes N6, Nn). In some embodiments, the rules gatekeeper 132 may be included in the rules node 120. In embodiments where the rules gatekeeper 132 is included in the rules node 120, the rules node 120 may cause an indication of the allowance or the denial of the action to be transmitted to the identified publisher node and/or to the identified subscriber node.

As discussed above, the gatekeeper 132 may determine an allowance or a denial of a node action based on the set of rules 125 that may define constraints, boundaries, or definitions that govern relationships between publisher nodes and subscriber nodes for various services and other interactions. For example, a rule may indicate that only publishers having certain credentials are allowed to publish a particular service, and that only subscribers having certain credentials are allowed to consume the published service. One possible instance of this example is a rule that indicates only a cockpit computer device node (e.g., node N6) may be allowed to publish flight monitoring data. The rule may also indicate that a node at an airport gate (e.g., node N1) may be allowed to subscribe to the flight monitoring data service, while consumer device nodes (e.g., smart phones, laptops, etc. belonging to passengers of the vehicle 130) are prevented from subscribing to the flight monitoring data service. A rule may provide a limit based on a temporal or spatial location of the vehicle, e.g., the node N1 is only permitted to subscribe to flight data services when the vehicle is on the ground after a flight has been completed.

In another example, a rule may indicate that a certain service may only be published and subscribed to by nodes that are using a first type of data bearer (e.g., an in-vehicle wired Ethernet connection), but not by nodes that are using a different type of data bearer (e.g., an in-vehicle Wi-Fi connection). In yet another example, rules may indicate that certain services may be given priority over other services, e.g., a service to deliver emergency information from an LRU to a ground server system may have priority over a text message sent by an on-board consumer device. In still another example, a rule may indicate that a user of a node having a certain security level has access to certain services, while a user of another node having a lesser security level is denied access, e.g., a cell phone used by a Federal Aviation Marshall may be allowed to subscribe to services that may be denied to a cell phone used by a paying passenger. Indeed, a rule may be based on a security level, a priority, and/or a type of a service. Additionally or alternatively, a rule may be based on a security level, a priority, a type, and/or an identity of a user of the node. In some embodiments, a rule may be based on a characteristic of a node, such as a type of a data bearer channel, an availability, a bandwidth, a latency, whether or not the node is fixedly connected to the vehicle, location based services, altitude based services, or some other characteristic. In some embodiments, a rule may be based on a current condition, such as a maximum number of nodes subscribed to a particular service, a flight or travel state of the vehicle, and the like. Other examples of some (but not all possible) types of rules can be found in aforementioned co-pending U.S. patent application Ser. No. 13/675,200 entitled "Vehicle Data Distribution System and Method".

In an embodiment, the set of rules 125 may be represented by weightings or priorities that are applied to or associated with each criterion (e.g., priority, security level, user type, type of service, etc.) and, in some cases, to each possible dynamic current condition (e.g., bandwidth, status, flight or travel condition, etc.). In an embodiment, the set of rules 125 may be represented by a set of logic statements, by a set of objects, by a database, and/or by any other suitable representation so that comparisons between various selection criterion, current conditions, and/or their values may be made. Generally, given an identification of a publisher, an identification of a subscriber, and/or a service, the set of rules 125 may be accessed by the rules gatekeeper 125 to determine an allowance or a denial of an action to be performed by the subscriber or the publisher.

In an embodiment, at least a subset of the rules 125 pertaining to a particular node may be copied from the rules node 120 into a memory of the particular node, and a rules gatekeeper 132 at the particular node may refer to the locally copied subset to determine whether an action is allowed or denied. In an embodiment, a particular node may query the rules node 120, and a rules gatekeeper at the rules node 120 may respond to the query with an indication of whether the action is allowed or denied based on the applicable rules 125 stored therein.

Furthermore, although the vehicle 130 illustrated in FIG. 1 is shown as an airplane, the rules node 120 may be fixedly connected to a vehicle other than an airplane, and the principles and techniques discussed herein may apply to vehicles other than airplanes. For example, the vehicle 130 may be a truck, a train, an automobile, a bus, a ship, a military vehicle, a space vehicle, or any air-borne, land-borne, water-borne or spacecraft. Generally, each vehicle may include a respective rules node 120 fixedly connected thereto or therein, may include one or more respective in-vehicle networks 110a, and may be communicatively coupled to one or more external networks 110b, 110c for example.

As previously discussed, the vehicle 130 may transport, within the cabin or body of the vehicle 130 or attached thereto, a rules node 120 and one or more publisher nodes and subscriber nodes, e.g., nodes N6-Nn. The vehicle 130 may additionally transport an on-board information distribution device 135 that serves as a portal for communications between nodes that are being transported by the vehicle 130 (e.g., nodes N6-Nn), and nodes that are external to the vehicle 130 (e.g., nodes N1-N5). As such, the on-board information distribution device 135 may be coupled to one or more antennas 140 to communicate, via the network 110b, with the nodes N1-N5 that are external to the vehicle 130. For example, the antennas 140 may enable air-to-air communication with other airborne aircraft 142, and/or may enable air-to-ground communication directly to a cell site 145, via a satellite communication system 150a, 150b, or to a Wi-Fi or similar short distance wireless system at a terminal 155, such as in a manner described in aforementioned co-pending U.S. patent application Ser. No. 13/675,200 entitled "Vehicle Data Distribution System and Method". In an embodiment, the other aircraft 142, the ground-based cell site 145, and the satellite 150a each may include one or more nodes (e.g., N4, N2, and N5, respectively) that are communicatively coupled to the vehicle-transported nodes N6-Nn using the common messaging protocol. In some embodiments, the rules node 120 is included in the on-board data distribution device 135.

In an embodiment, ground-based nodes associated with the vehicle 130 (e.g., N1 at terminal 155, N2 at cell site 145, N3 at a data center 196 and N5 of a satellite communications system) may be communicatively coupled through a ground-based network 110c. In an embodiment, the ground-based network 110c may be essentially a wired network, but may include portions that are wireless. In an embodiment, the ground-based nodes N1, N2, N3, N5 and the ground-based network 110c may be included in a ground-based data delivery system 160, such as the system described in aforementioned co-pending U.S. patent application Ser. No. 13/675,190 entitled "Ground System for Vehicle Data Distribution".

As seen in FIG. 1, a data center 196 of the ground-based system 160 may be communicatively coupled to the network 110c. In an embodiment, the data center 196 includes a rules definition engine 198. The rules definition engine 198 may provide a user interface 199 to enter, create, define or update the set of rules that define the relationships between the publisher nodes and subscriber nodes N1-Nn associated with the vehicle 130. A user interacting with the user interface 199 may enter updates to the set of rules into the rules definition engine 198, for example. Subsequently, the rules definition engine 198 may cause the set of rules 125 stored in the rules node 120 to be updated. In an example scenario, the rules 125 may be updated while the vehicle 130 is airborne or otherwise en route using air-to-ground (ATG) communication. For instance, one or more updated rules 125 may be delivered from the data center 196 via the network 110c to the cell site 145, from the cell site 145 via the network 110b to the antenna 140, and from the antenna 140 to the on-board data delivery system 135 and to the rules node 120. In another example scenario, the vehicle 130 is parked at a terminal or gate 155, and the rules updates may be delivered to the on-board data delivery device 135 through short range wireless technology, e.g., an IEEE 802.11 standard compliant protocol.

The updates may be pushed to the rules node 120 by the rules definition engine 198, or the updates may be pulled by the rules node 120 from the rules definition engine 198, either automatically or based on a user request. Examples of rules creation and updating may be found in aforementioned co-pending U.S. patent application Ser. No. 13/675,200 entitled "Vehicle Data Distribution System and Method", and in aforementioned co-pending U.S. patent application Ser. No. 13/675,190 entitled "Ground System for Vehicle Data Distribution".

Figure 2:
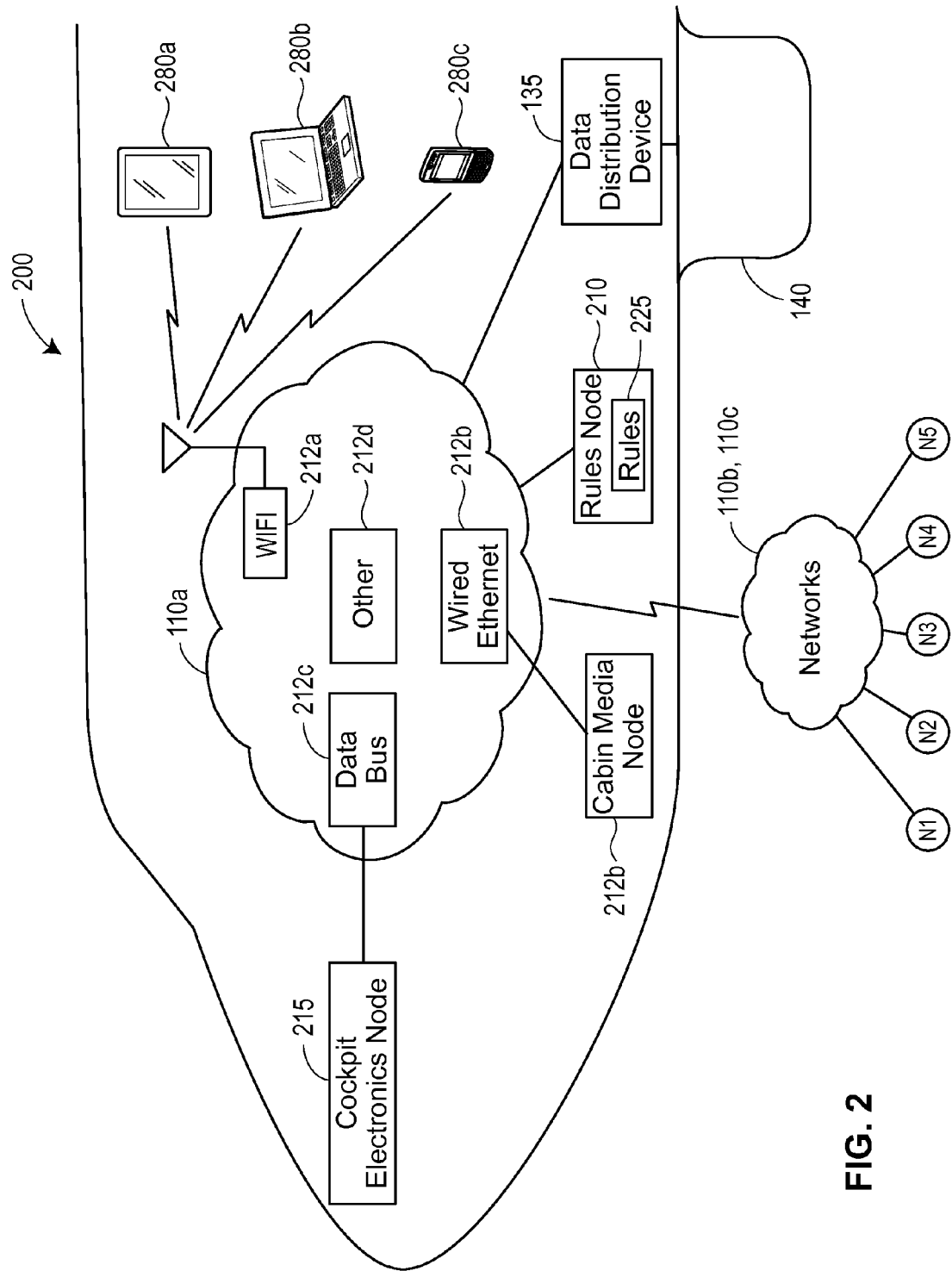
FIG. 2 illustrates an embodiment of the system illustrated in FIG. 1 in which the vehicle is an aircraft.

FIG. 2 includes an example embodiment 200 of the vehicle 100 of FIG. 1, and, for ease of explanation, is described with simultaneous reference to elements shown in FIG. 1. In FIG. 2, the vehicle 100 of FIG. 1 is an aircraft 200 having a rules node 210 in an LRU that is fixedly and rigidly connected to the aircraft 200. The aircraft 200 transports various other transported nodes (e.g., nodes 215, 218, 280a-280c) and is in communicative connection with various external nodes (e.g., N1-N5 of FIG. 1). Each of the transported and external nodes associated with the vehicle 200 may use the common messaging protocol to join one of the networks 110a, 110b, and/or 110c, to communicate with the rules node 210, to discover one another, to publish services, and/or to subscribe to published services as indicated by the rules 225 included in the rules node 210 of the aircraft 200. The following scenarios described with respect to FIG. 2 are not meant to be limiting, but rather demonstrate possible features, aspects and techniques of the systems and methods for publishing and subscribing to services corresponding to a vehicle.

As many of the devices on-board the aircraft 200 are required to be secured during flight, at least some of the transported nodes aboard the aircraft 200 in addition to the rules node 210 may be included in a line-replaceable-unit (LRU) that is fixedly and rigidly attached to the aircraft 200. Typically, an LRU is an electronic assembly that performs a specific function in the aircraft 200 and may be removed or replaced as a unit and serviced at an aircraft maintenance center or flight line. For example, in an embodiment, the rules node 210 servicing the transported nodes of the vehicle 200, a cockpit electronics unit 215, and a cabin media unit 218 may be provided in respective LRUs. Of course, other types of nodes being transported by the vehicle 200 may be provided in respective LRUs.

Other nodes being transported by the vehicle 200 may not be included in LRUs of the aircraft 200. For example, instead of being fixedly connected to the aircraft 200 via LRUs, these other nodes may be fixedly connected to the aircraft 200 using some other means, such as a bracket or other connecting device. Still other nodes being transported by the vehicle 200 may not be fixedly and/or rigidly connected to the aircraft 200 at all. Typically, these nodes (e.g., the nodes 280a, 280b, 280c) may be consumer devices (e.g., tablet, laptop, cell phone, smart device, etc.) of passengers or crew members who are aboard the aircraft 200.

The transported nodes 210, 215, 218, 280a-280c may be communicatively connected by an in-vehicle network 110a. In an embodiment, the in-vehicle network 110a may include one or more wireless networks and/or one or more wired networks, such as a Wi-Fi network 212a, a wired Ethernet network 212b, an aircraft data bus 212c, and other in-vehicle wireless and wired networks 212d. Each transported node may be communicatively connected to one or more of the networks that are included in the in-vehicle network 110a.

For example, a cockpit electronics unit or node 215 may be an LRU that collects electronic information during flight from various instruments in the cockpit of the aircraft 200. The cockpit electronics unit 215 may communicatively connect to the rules node 210 using a data bus 212c included in the network 110a (e.g., a data bus compliant with ARINC-429, MIL-STD-1553, IEEE 802.3, or other suitable standard), and may communicate with the rules node 210, using the common messaging protocol, to determine whether or not the cockpit electronics unit 215 is allowed to publish particular services. If approval is granted based on the rules 225 stored in the rules node 210, the cockpit electronics unit node 215 may publish, using the common messaging protocol over the data bus 212c, a service that provides collected flight information such as altitude, airspeed, aircraft position, or other flight state information. Also based on the rules 225, in an embodiment, a ground-based node (e.g., N5 at the data center 196) may be allowed to subscribe to (using the common messaging protocol) the published flight information service of the cockpit electronics node 215 in the aircraft 200. Accordingly, node N5 at the data center 196 may receive periodic in-flight reports from the cockpit electronics unit 215 via the ad-hoc network 110. For example, the node N5 may receive the periodic reports via the in-vehicle network 110a, the wireless network 110b in connection with ground-based cell sites 145, and the ground network 110c. In some embodiments, rather than the node N5 at the data center 196 subscribing to the published flight information service, each cell site node N2 at cell sites 145 in the flight path of the aircraft 200 may individually subscribe to the service so that the flight information is received at the cell sites 145 while the aircraft 200 is in flight. The receiving cell site node 145 may then forward the received flight information to the data center 196 or other desired ground-based location. In some embodiments, a ground-based node N1 at a terminal 155 may subscribe to the published flight information service, so that after the aircraft 200 has arrived at the terminal, the subscribed node N1 at the terminal 155 may receive the in-flight information and may deliver the information to the data center 196 or other desired ground-based location.

Another example of a transported node may be a cabin media unit or node 218. The cabin media node 218 may publish (using the common messaging protocol, and only if and when allowed as per the rules 225) a movie, entertainment or media service for passengers on board the aircraft 200 via the in-cabin Wi-Fi network 212a included in the in-vehicle network 110a. Various consumer devices 280a-280c in the cabin of the vehicle 200 may each discover, using the common messaging protocol, the cabin media node 218 and its published entertainment service via the Wi-Fi network 212a. The consumer devices 280a-280c may subscribe to (if and when allowed as per the rules 225) the service so that their users may select movies and other digital media to view during flight.

The media content stored in the cabin media node 218 may be updated using the common messaging protocol, in an embodiment. For example, in an example scenario, a ground-based node such as the node N3 at the data center 196 may publish, using the common messaging protocol over the ad-hoc network 110 to the aircraft 200, a media update service. In other embodiments, the node N3 at the data center 196 may deliver updated media content to the ground-based terminal node N1 at the terminal 155, and the ground-based terminal node N1 may publish the media update service. The cabin media node 218 may subscribe to (if and when allowed, according to the rules 225) the media update service, and may receive updated media content via the ad-hoc network 110 (e.g., via the ground-based network 110c, the wireless network 110b, and the in-vehicle network 110a) while the aircraft 200 is in flight or while the aircraft is parked at a terminal.

Thus, as illustrated in the above example scenarios, various nodes being transported by the aircraft (e.g., nodes 210, 215, 218, 280a-280c) and various nodes external to the aircraft 200 (e.g., nodes N1-N5) may discover one another using the common messaging protocol over the ad-hoc network 110, and may publish services and subscribe to services as governed by the rules 225 stored in the rules node 210. Of course, other types of nodes and services other than those described herein are possible.

Figure 3:
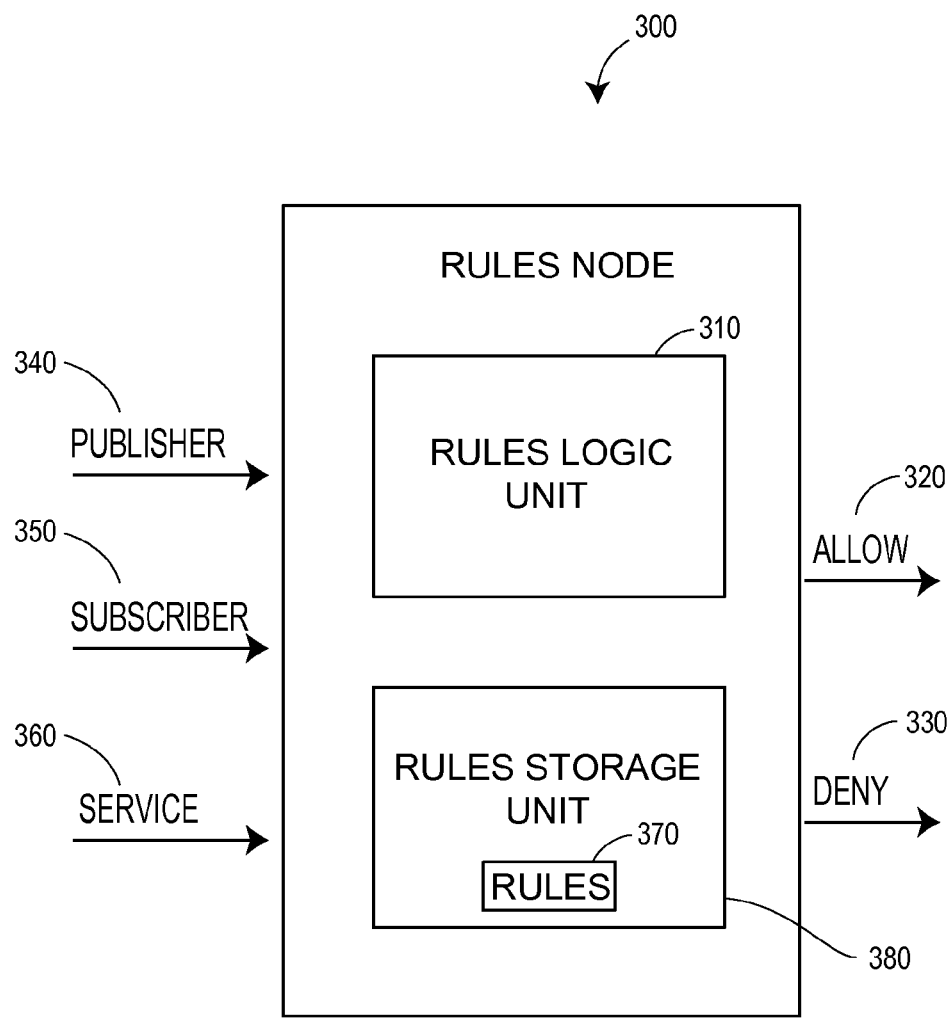
FIG. 3 illustrates a block diagram of an example rules node.

FIG. 3 illustrates an embodiment of the rules node 300, such as the rules node 120 of FIG. 1 or the rules node 210 of FIG. 2. The rules node 300 may include a rules logic unit 310 that determines whether to allow 320 or deny 330 an action to be performed by a node. The action governed by the rules logic unit 310 may be, for example, an authentication of another node, a publication of a service provided by the node, a consumption of a published service by the node, or some other node action. In some embodiments, in addition to or instead of the rules logic unit 310 being included in the rules node 300, the rules logic unit 310 is additionally or alternatively included in at least one publisher node and/or in at least one subscriber node. For example, the rules gatekeeper 132 of FIG. 1 may include the rules logic unit 310. The rules logic unit 310 may receive one or more inputs such as an indication of a publisher node 340, a subscriber node 350, and/or a service 360, and may determine, based on one or more inputs, whether the action is allowed 320 or denied 330 based on at least one rule included in a set of rules 370 stored in a rules storage unit 380. In an embodiment, the rules logic unit 310 performs at least some of an embodiment of a method 400 shown in FIG. 4.

Figure 4:
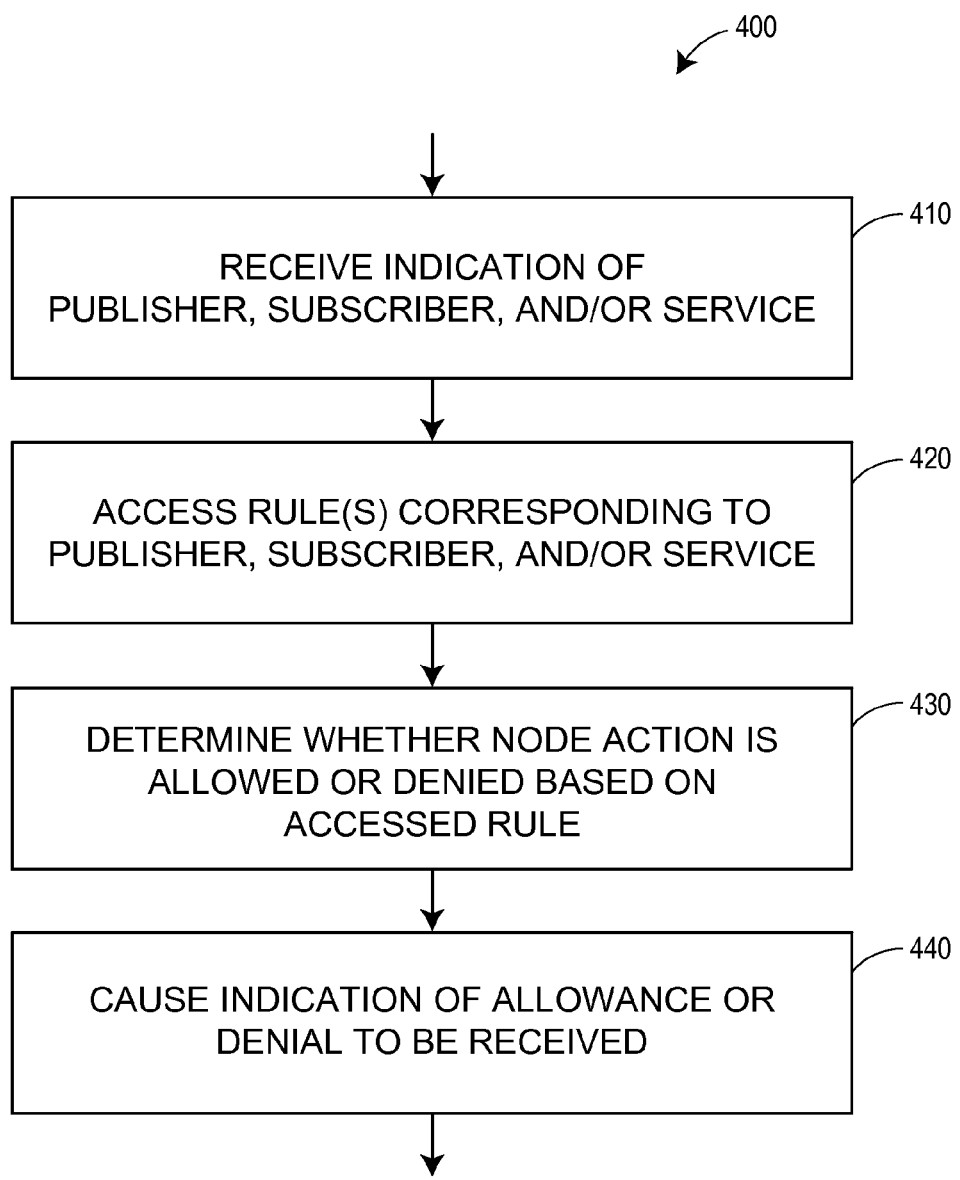
FIG. 4 is an example flow of a method to determine or allow an action that is desired to be taken by a node of the ad-hoc network of FIG. 1.

FIG. 4 is an example flow of a method 400 to determine or allow an action that is desired to be taken by a node, or a node action. The method 400 may be performed by the system 100 of FIG. 1, the system 200 of FIG. 2, or by other suitable systems. At a block 410, the method 400 may include receiving an indication of an identification of a publisher node, an identification of a subscriber node, and/or an identification of a service to published or consumed. In some embodiments, an indication of the desired node action is also received.

At a block 420, at least one of the set of rules corresponding to the indicated the publisher node, subscriber node, and/or service may be accessed. For example, one or more of the rules 370 stored in the rules node storage unit 380 of FIG. 3 may be accessed. At a block 430, a determination of whether or not the desired action is to be allowed or denied is made based on the one or more rules accessed at the block 420. For example, the one or more accessed rules may indicate combinations of characteristics and priorities of subscribers, publishers and services that are allowed and that are not allowed. In an embodiment, the one or more accessed rules may indicate one or more current, transient conditions (e.g., flight state, bandwidth, or other transient condition) that may impact allowance or denial. At a block 440, an indication of the allowance or the denial is caused to be received, for example, by the publisher node and/or by the subscriber node.

Figure 5:
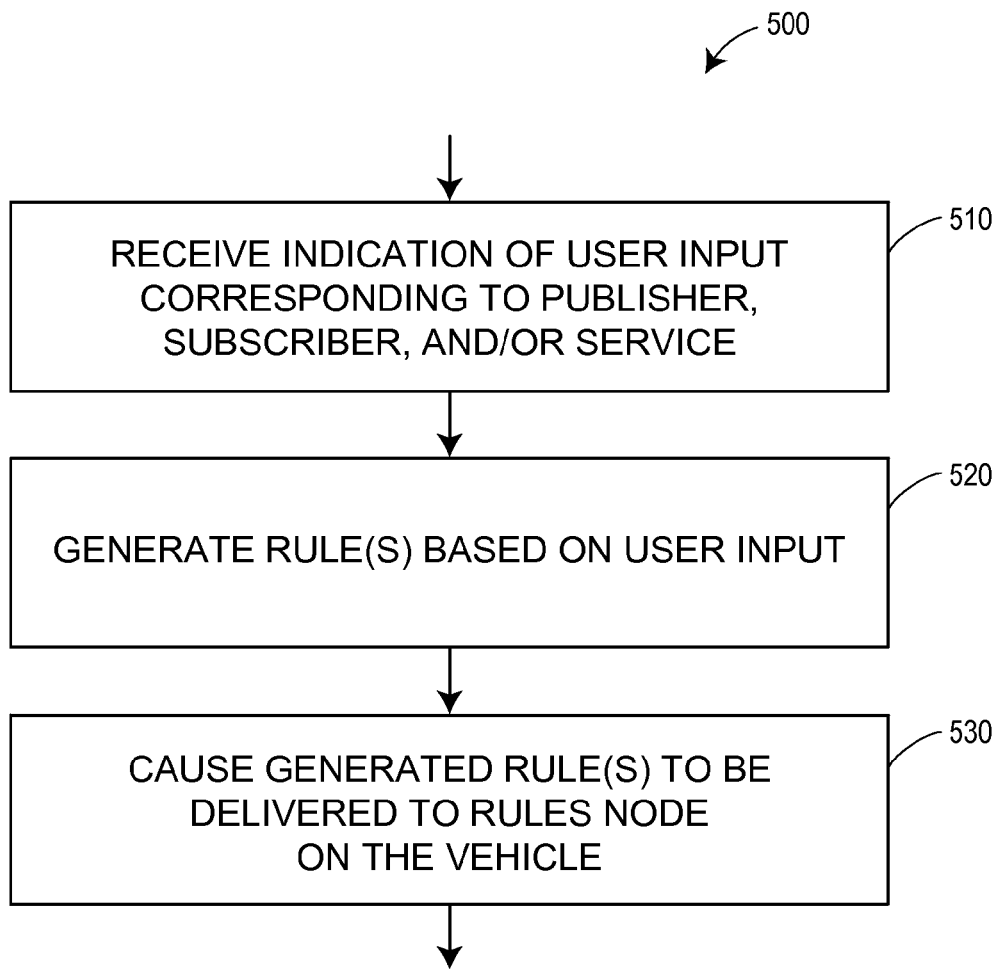
FIG. 5 is an example flow of a method to generate or update one or more rules of a rules node.

FIG. 5 is an example flow of a method 500 to generate or update one or more rules of a rules node, such as the rules node 120 of FIG. 1, the rules node 210 of FIG. 2, the rules node 300 of FIG. 3, other suitable rules node. At a block 510, an indication of a user input defining a relationship between at least one publisher, at least one subscriber, and/or at least one service may be received. For example, the user input may be received at the user interface 199 of the data center 196 shown in FIG. 1. In an embodiment, the user input is received by a rules definition engine 198. The user input may indicate permissions and priorities of various users, nodes, and/or services based on, for example, a security level of a user or a service, a type of data bearer channel over which a node communicates, a characteristic of a publisher node or of a subscriber node, an identity of a user of the publisher node or of the subscriber node, a type of service, and other characteristics.

At a block 520, an electronic representation of the set of rules may be generated based on the received user input. For example, the set of rules 125, 225 or 370 may be generated in an electronic representation. The electronic representation of the set of rules may be, for example, a set of logic statements, a set of objects, a database, and/or any other suitable electronic representation so that comparisons between various selection criterion, current conditions, and/or their values may be made. The generated rules may specify the constraints, boundaries, or definitions that govern relationships between publisher nodes and subscriber nodes for various services and other interactions, in a format and/or manner such as previously discussed. At a block 530, the electronic representation of the set of rules may be delivered to a rules node at a vehicle to be stored (e.g., in the rules node storage unit 380 of the rules node 300). In an embodiment, the set of rules may be delivered via the network 110c and the networks 110b and 110a to the rules node 120 of the vehicle 100.

In some embodiments of the method 500, such as when a set of rules already has been previously generated and stored, the method 500 may be applied to at least a subset of the rules, e.g., to update one or more of the stored rules.

As previously discussed, each of the nodes corresponding to or associated with a vehicle (e.g., nodes N1-Nn corresponding to the vehicle 100 of FIG. 1) may communicate using a common, shared messaging protocol having a shared set of commands at the application layer. The shared messaging protocol may allow nodes to discover one another in spite of the different lower layer protocols across different nodes. For example, referring to FIG. 2, a cockpit unit 215 may utilize a ARINC compatible data bus and a node N1 at a terminal 155 may use a 802.11 compatible wireless protocol, yet the cockpit unit 215 and the terminal node N1 may still be able to communicate at the application layer of the common messaging protocol to discover one another when the aircraft 200 is parked at the terminal. In another example, In an embodiment, the common, shared messaging protocol is a proprietary or private protocol.

The common messaging protocol may allow each publisher, for example, to publish indications of available services, authenticate with potential subscriber nodes, communicate with a rules node to determine whether or not to provide a service to a particular subscriber, and provide the service from the publisher node to the subscriber node. Likewise, the shared messaging protocol may allow each subscriber, for example, to discover an indication of an available service from a publisher, authenticate with a publisher, communicate with a rules node to determine whether or not to consume a service from a particular publisher, and consume the service from the publisher. In an embodiment, the common messaging protocol may include commands or messages for joining and leaving an ad-hoc network that supports publishing and subscribing services to and from nodes associated with vehicle; discovering other nodes in the ad-hoc network; selecting a service provider; querying for services, subscribing to a service, and unsubscribing to the service; starting a service, stopping a service, and providing a notification of or publishing a service; and/or performing other node actions in the ad-hoc network.

Figure 6:
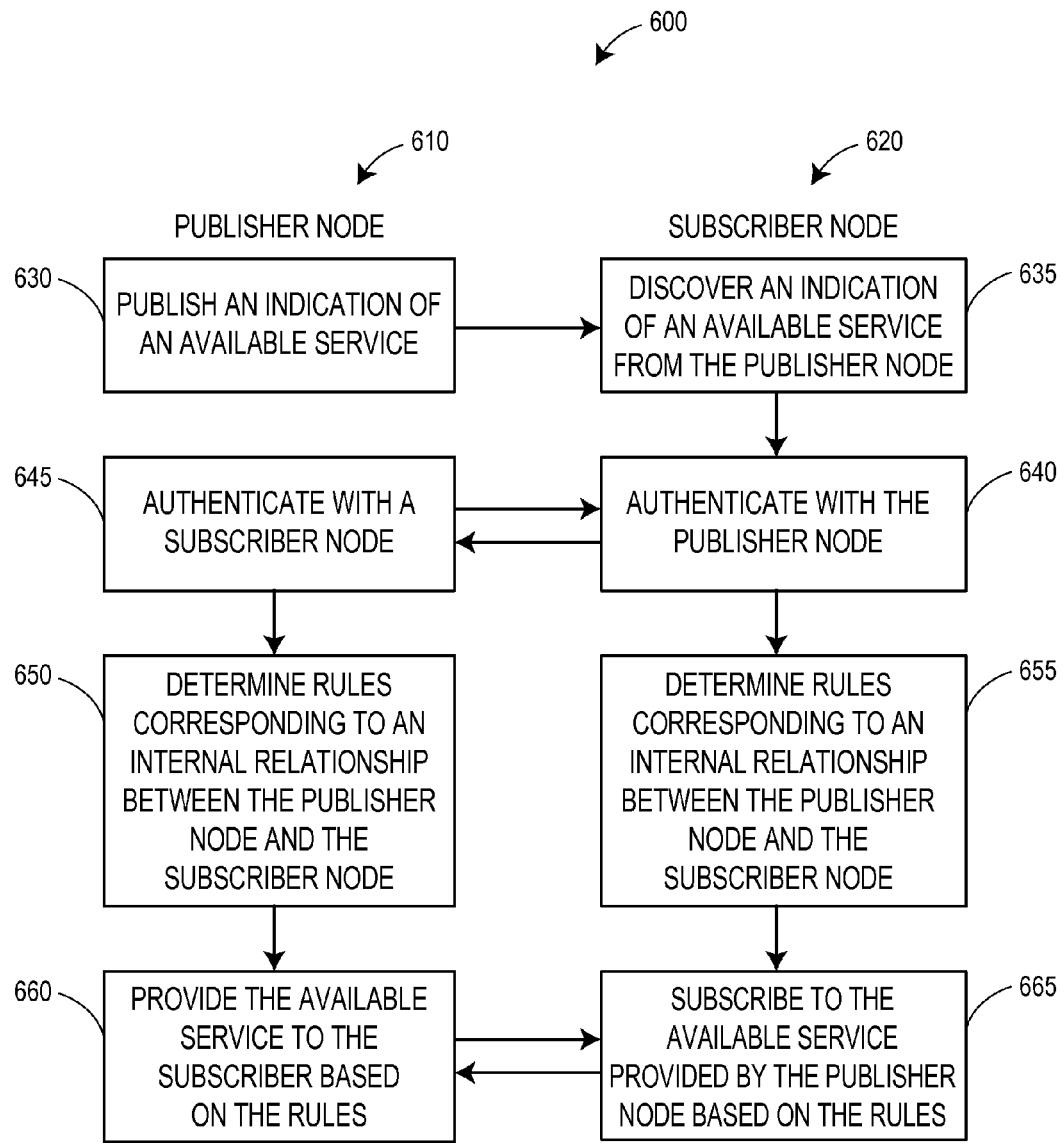
FIG. 6 is an example flow of a method to implement a common messaging protocol in both a publisher node and subscriber node associated with a vehicle.

FIG. 6 illustrates an example method 600 to implement such a common messaging protocol in a publisher node 610 and subscriber node 620 associated with a vehicle (e.g., the vehicle 100 of FIG. 1), so that the subscriber 620 may consume a service published by the provider 610. In an embodiment, at least one of the nodes 610, 620 is being transported by the vehicle. The method 600 may be used in the system 100, the system 200, or in any other suitable system. At the start of the method 600, the publisher node 610 and the subscriber 620 have each already joined the ad-hoc network, e.g., by using the common messaging protocol.

Using the common messaging protocol, the publisher node 610 may publish an indication of an available service that the publisher node 610 is able to provide (block 630). The subscriber node 620 may then discover the indication of the published service (block 635).

Next, the subscriber node 620 and/or the publisher node 610 may perform an authentication process (blocks 640, 645). For example, the subscriber node 620 may authenticate (block 640) the publisher node 610 to determine whether the publisher node 610 is a legitimate node or provider of services in the ad-hoc network, and/or the publisher node 610 may authenticate (block 645) the subscriber node 620 to determine whether the subscriber node 610 is a legitimate node or consumer of services in the ad-hoc network. In an embodiment, one of the nodes 610, 620 may use a public key authentication scheme to validate the identity of the other node 610, 620. Of course, other authentication technologies may be used to provide a level of security that is desired or required.

After the publisher node 610 and subscriber node 620 have been authenticated, the publisher node 610 may determine, based on a set of rules stored at a rules node of the vehicle, whether or not providing the published service to the subscriber node 620 is allowed (block 650). Likewise, the subscriber node 620 may determine, based on the set of rules stored at the rules node, whether or not consuming the published service from the publisher node 610 is allowed (block 655). If both the providing action and the consuming action are allowed, the publisher node 610 may provide the published service to the subscriber node 620 (block 660), and the subscriber node 620 may consume the published service (block 665).

In an embodiment, at least some of the blocks 630, 645, 650 and 660 of the publisher node 610 are performed by a publishing engine at the publisher node 610. In an embodiment, the publishing engine includes computer-executable instructions stored on a memory of the publisher node 610 and executable by a processor of the publisher node 610. In an embodiment, at least some of the blocks 635, 640, 655 and 665 of the subscriber node are performed by a subscribing engine at the subscriber node 620. In an embodiment, the subscribing engine includes computer-executable instructions stored on a memory of the subscriber node 620 and executable by a processor of the subscriber node 620.

Figure 7:
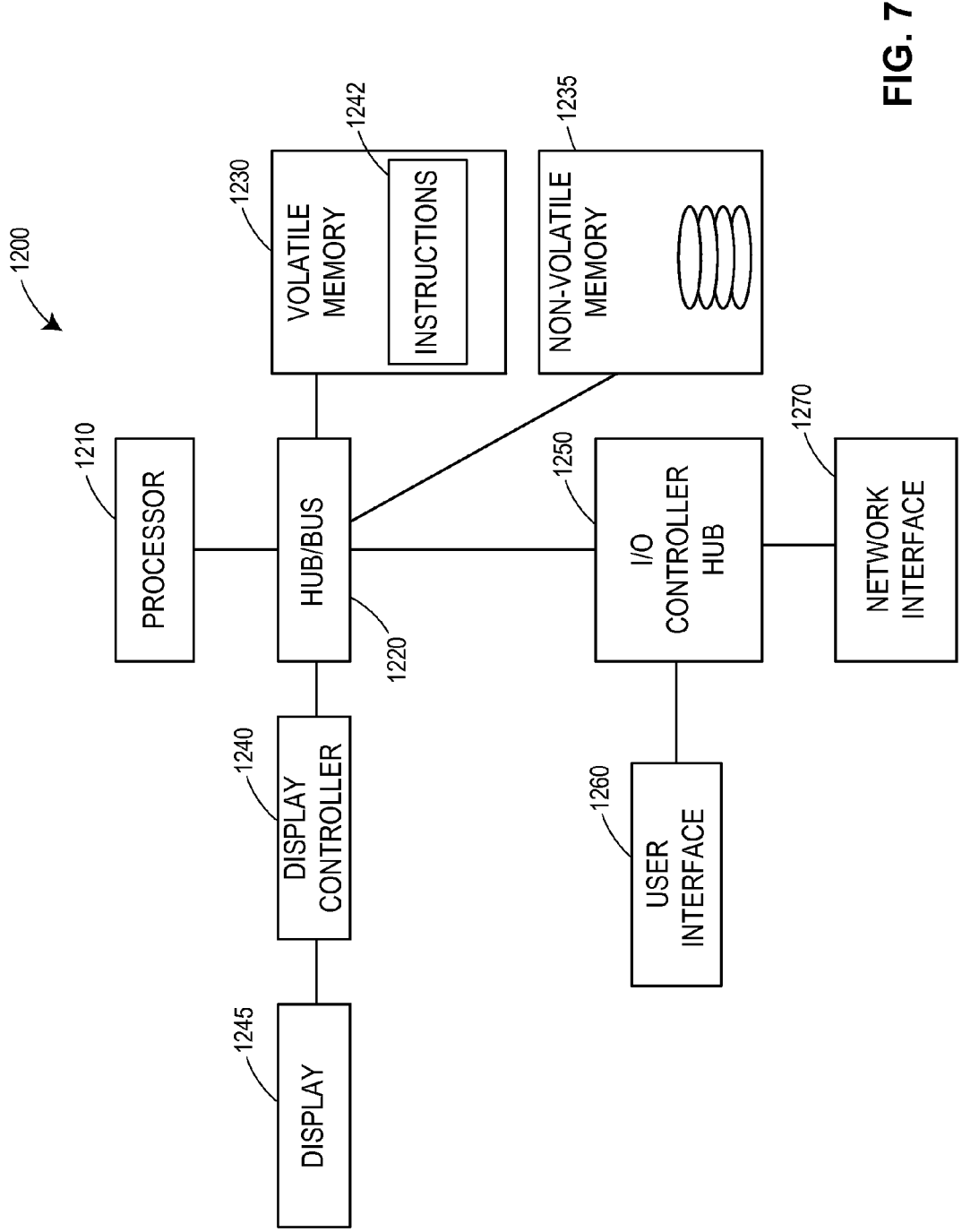
FIG. 7 is a block diagram of a computing device that may be used in a node of FIGS. 1-3.

FIG. 7 illustrates an embodiment of a computing device 1200 that may be included in any or all of the transported and external nodes associated with the vehicles 100, 200 illustrated in FIGS. 1 and 2. Additionally, other devices illustrated in FIGS. 1 and 2 such as the on-board data distribution device 135 may include an embodiment of the computing device 1200. The device 1200 may include, for example, a central processing unit (CPU) or processor 1210 and one or more busses or hubs 1220 that connect the processor 1210 to other elements of the computing device 1200, such as a volatile memory 1230, a non-volatile memory 1235, a display controller 1240, and an I/O controller 1250. The volatile memory 1230 and the non-volatile memory 1235 may each include one or more non-transitory, tangible computer readable storage media such as random access memory (RAM), read only memory (ROM), FLASH memory, a hard disk drive, a digital versatile disk (DVD) disk drive, a Blu-ray disk drive, etc.).

In an embodiment, the memory 1230 and/or the memory 1235 may store instructions 1242 that are executable by the processor 1210. For example, the instructions may be the instructions comprising the rules logic unit 310, the publishing engine, the subscribing engine, or the rules gatekeeper 132. Indeed, each of the modules, applications and engines described herein can correspond to a set of machine readable instructions for performing one or more functions described above. These modules need not be implemented as separate software programs, procedures or modules, and thus various subsets of these modules can be combined or otherwise re-arranged in various embodiments. In some embodiments, at least one of the memories 1230, 1235 stores a subset of the modules and data structures identified herein. In other embodiments, at least one of the memories 1230, 1235 stores additional modules and data structures not described herein.

In an embodiment, the display controller 1240 may communicate with the processor 1210 to cause information to be presented on a connected display device 1245. In an embodiment, the I/O controller 1250 may communicate with the processor 1210 to transfer information and commands to/from the user interface 1260, which may include a mouse, a keyboard or key pad, a touch pad or screen, click wheel, lights, a speaker, a microphone, etc. Additionally, data or information may be transferred to and from the computing device 1200 via a network interface 1270. For example, data or information may be transferred to and from the ad-hoc network 110. In some embodiments, the computing device 1200 may include more than one network interface 1270, such as a wireless interface and a wired interface.

The computing device 1200 is only one example of a computing device 1200, and other suitable devices can have more or fewer components than shown, can combine two or more components, or a can have a different configuration or arrangement of the components. The various components shown in FIG. 7 can be implemented in hardware, a processor executing software instructions, or a combination of both hardware and a processor executing software instructions, including one or more signal processing and/or application specific integrated circuits.

Of course, the applications and benefits of the systems, methods and techniques described herein are not limited to only the above examples. Many other applications and benefits are possible by using the systems, methods and techniques described herein.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects:

1. A system for publishing services and subscribing to services comprises a rules node fixedly connected to a vehicle. The rules node includes an interface to a network and a rules node memory storing a set of rules defining relationships between one or more publisher nodes and one or more subscriber nodes; and includes computer-executable instructions stored on a tangible, non-transitory computer-readable storage medium. The computer-executable instructions are executable by a processor to receive at least one of an identification of a publisher node or an identification of a subscriber node, and determine, based on at least one rule included in the set of rules and the at least one of the identification of the publisher node or the identification of the subscriber node, whether an action to be taken by at least one of the publisher node or the subscriber node is allowed. At least one of the publisher node or the subscriber node is being transported by the vehicle, and the rules node is a sole, active rules provider node of a set of nodes associated with the vehicle. Additionally, the rules node, the publisher node and the subscriber node are communicatively coupled via the network, and the computer-readable storage medium on which the computer-executable instructions are stored is included in one of the publisher node, the subscriber node, or the rules node.

2. The system of the previous aspect, wherein the computer-readable storage medium on which the computer-executable instructions are stored is the rules node memory, and wherein the computer-executable instructions are executable by a processor of the rules node further to cause an indication of an allowance or a denial of the action to be taken to be transmitted to at least one of the publisher node or the subscriber node.

3. The system of any of the preceding aspects, wherein the action to be taken by the at least one of the publisher node or the subscriber node includes at least one of: an authentication of the publisher node or the subscriber node, a publication of a provided service by the publisher node, a subscription to a published service by the subscriber node.

4. The system of any of the preceding aspects, wherein the provided service or the published service is a public branch exchange voice service, a time service, a global positioning system service, a configuration service, a media server service, a domain name service, a wireless access point service, a storage service, a dynamic fault management and reporting service, a bearer data service; a software key service, a digital rights management service, a health monitoring and reporting service, or a flight information service.

5. The system of any of the preceding aspects, wherein the computer-executable instructions are executable by the processor further to receive an indication that the provided service or the published service is a failed service; determine, based on the at least one rule or at least one other rule included in the set of rules, a backup service for the failed service; and cause an indication of the backup service to be transmitted.

6. The system of any of the preceding aspects, wherein at least one rule included in the set of rules is based on at least one of a security level, a type of data bearer channel, a priority, a dynamic condition, a characteristic of the at least one of the publisher node or the subscriber node; or an identity of a user of the at least one of the publisher node or the subscriber node.

7. The system of any of the preceding aspects, wherein the publisher node is configured to communicate using a first type of data bearer channel, the publisher node is configured to communicate using a second type of data bearer channel, and the publisher node and the subscriber node are both configured to communicate with each other at a level higher than the first data bearer channel and the second bearer channel using a common messaging protocol.

8. The system of any of the preceding aspects, further comprising a rules definition engine included in a computing device that is not being transported by the vehicle, and wherein at least one rule included in the set of rules of the rules node is updated based on the rules definition engine.

9. A publisher node includes an interface to a network. The publishing node further includes a publishing engine configured to: publish an indication of an available service using the interface to the network; determine, based on a set of rules provided by a rules node fixedly connected to a vehicle and communicatively connected to the network, one or more rules corresponding to an interrelationship between the publisher node and a subscriber node that is authenticated; and provide the published service to the subscriber node based on the one or more rules. In some embodiments, the publisher node is included in any of the preceding aspects.

10. The publisher node of the preceding aspect, wherein the rules node comprises the publisher node, or wherein the rules node comprises the subscriber node.

11. The publisher node of any of the preceding aspects, wherein the one or more rules correspond to at least one of: a characteristic of at least one data bearer channel communicatively coupling the publisher node to the subscriber node; a priority of the published service; a characteristic of the at least one of the publisher node or the subscriber node; an identity of a user of the at least one of the publisher node or the subscriber node; or a dynamic condition.

12. The publisher node of any of the preceding aspects, wherein the at least one of the publisher node or the subscriber node is transported by the vehicle.

13. The publisher node of any of the preceding aspects, wherein the rules node is an only node being transported by the vehicle that is an active provider node of the set of rules.

14. The publisher node of any of the preceding aspects, wherein the available service includes at least one of: a public branch exchange voice service, a time service, a global positioning system service, a configuration service, a domain name service, a wireless access point service, a storage service, a dynamic fault management and reporting service, a bearer data service; a software key service, a digital rights management service, a health monitoring and reporting service, or a flight information service.

15. A subscriber node includes an interface to a network and a subscribing engine configured to: receive, via the interface to the network, an indication of a published service provided by a publisher node that is authenticated; request, via the interface to the network, the published service from the publisher node; and subscribe to, based on one or more rules provided by a rules node fixedly connected to a vehicle, the published service via the connection to the network. The one or more rules correspond to an interrelationship between the subscriber node and the publisher node. In some embodiments, the subscriber node operates in conjunction with any of the preceding aspects.

16. The subscriber node of the preceding aspect, wherein one of the rules node comprises the publisher node, or the rules node comprises the subscriber node.

17. The subscriber node of any of the preceding aspects, wherein the one or more rules correspond to at least one of: a characteristic of a data bearer channel communicatively coupling the publisher node to the subscriber node; a priority of the published service; a dynamic condition; a characteristic of the at least one of the publisher node or the subscriber node; or an identity of a user of the at least one of the publisher node or the subscriber node.

18. The subscriber node of any of the preceding aspects, wherein the rules node is an only node being transported by the vehicle that is an active provider node of the set of rules.

19. The subscriber node of any of the preceding aspects, wherein one of the publisher node or the subscriber node is transported by the vehicle, and the other one of the publisher node or the subscriber node is not transported by the vehicle.

20. The subscriber node of any of the preceding aspects, wherein the available service comprises at least one of: a public branch exchange voice service, a time service, a global positioning system service, a configuration service, a domain name service, a wireless access point service, a storage service, a dynamic fault management and reporting service, a bearer data service; a software key service, a digital rights management service, a health monitoring and reporting service, or a flight information service.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed is:
1. A system for publishing services and subscribing to services, comprising:
a rules node fixedly connected to a vehicle, the rules node including an interface to a network and a rules node memory storing a set of rules defining relationships between one or more publisher nodes and one or more subscriber nodes; and computer-executable instructions stored on a tangible, non-transitory computer-readable storage medium and executable by a processor to:

receive at least one of an identification of a publisher node or an identification of a subscriber node;

determine, based on at least one rule included in the set of rules and the at least one of the identification of the publisher node or the identification of the subscriber node, whether an action to be taken by at least one of the publisher node or the subscriber node is allowed;

receive an indication that a provided service or a published service is a failed service;

determine, based on the at least one rule or at least one other rule included in the set of rules, a backup service for the failed service; and cause an indication of the backup service to be transmitted, wherein:

at least one of the publisher node or the subscriber node is being transported by the vehicle, the rules node is a sole, active rules provider node of a set of nodes associated with the vehicle, the rules node, the publisher node and the subscriber node are communicatively coupled via the network, and the computer-readable storage medium on which the computer-executable instructions are stored is included in one of the publisher node, the subscriber node, or the rules node.

2. The system of claim 1, wherein the computer-readable storage medium on which the computer-executable instructions are stored is the rules node memory, and wherein the computer-executable instructions are executable by a processor of the rules node further to cause an indication of an allowance or a denial of the action to be taken to be transmitted to at least one of the publisher node or the subscriber node.

3. The system of claim 1, wherein the action to be taken by the at least one of the publisher node or the subscriber node includes at least one of:

an authentication of the publisher node or the subscriber node, a publication of the provided service by the publisher node, or a subscription to the published service by the subscriber node.

4. The system of claim 1, wherein the provided service or the published service is one of:

i) a public branch exchange voice service;
ii) a time service;
iii) a global positioning system service;
iv) a configuration service;
v) a domain name service;
vi) a wireless access point service;
vii) a storage service;
viii) a dynamic fault management and reporting service;
ix) a bearer data service;
x) a software key service;
xi) a digital rights management service;
xii) a health monitoring and reporting service; or
xiii) a flight information service.

5. The system of claim 1, wherein at least one rule included in the set of rules is based on at least one of:

a security level;
a type of data bearer channel;
a priority;
a dynamic condition;
a characteristic of the at least one of the publisher node or the subscriber node; or
an identity of a user of the at least one of the publisher node or the subscriber node.

6. The system of claim 1, wherein:

the publisher node is configured to communicate using a first type of data bearer channel;

the publisher node is configured to communicate using a second type of data bearer channel; and the publisher node and the subscriber node are both configured to communicate with each other at a level higher than the first data bearer channel and the second bearer channel using a common messaging protocol.

7. The system of claim 1, further comprising a rules definition engine included in a computing device that is not being transported by the vehicle, and wherein at least one rule included in the set of rules of the rules node is updated based on the rules definition engine.

\* \* \* \* \*